Patented May 28, 1929.

1,714,677

UNITED STATES PATENT OFFICE.

GEORG KRÄNZLEIN AND MARTIN CORELL, OF HOCHST-ON-THE-MAIN, GERMANY, ASSIGNORS TO GRASSELLI DYESTUFF CORPORATION, OF NEW YORK, N. Y., A CORPORATION OF DELAWARE.

CONDENSATION PRODUCT OF THE BENZANTHRONE SERIES AND PROCESS OF PREPARING SAME.

No Drawing. Application filed March 5, 1926, Serial No. 92,585, and in Germany March 9, 1925.

We have found that by heating a compound of the general formula:

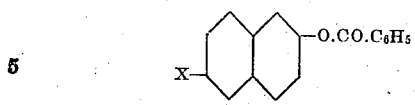

wherein X represents hydrogen or the group —OCO.$C_6H_5$ to a temperature between about 100° C. and about 200° C. in the presence of aluminum chloride while introducing oxygen, new condensation products are obtainable. When using benzoic acid ester of $\beta$-naphthol there is obtained $\alpha$-hydroxybenzanthrone, whereas when using the dibenzoic acid ester of 2.6-dihydroxynaphthalene the hitherto unknown 1.6-dihydroxy-3.4.8.9-dibenzpyrenequinone is obtained.

The following examples serve to illustrate our invention, the parts being by weight:

1. A mixture of 100 parts of the dibenzoic acid ester of 2.6-dihydroxynaphthalene (melting point 217°), 1000 parts of tetrachloroethane and 100 parts of aluminium chloride is heated to boiling for 5 hours while stirring. At the beginning of the reaction the whole becomes dissolved and after a short time the product of the reaction separates. This product is drained off, washed and extracted with boiling water. The gross yield amounts to 97 parts. The product is then recrystallized from nitrobenzene and has its melting point at 275° C.

Analysis shows that the body probably constitues 1.5-dibenzoyl-2.6-dihydroxynaphthalene:

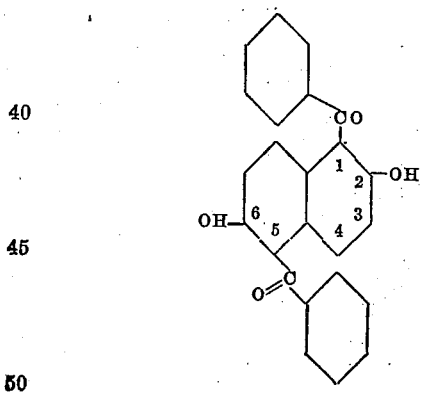

2. If the 1.5-dibenzoyl-2.6-dihydroxynaphthalene referred to in Example 1 is melted with ten times the quantity of sodium-aluminium chloride at 140–150°, while introducing oxygen, the hitherto unknown 1.6-dihydroxy-3.4.8.9-dibenzpyrenequinone of the following constitution:

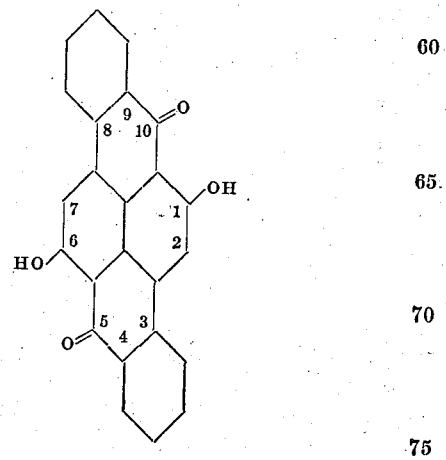

is obtained with a good yield together with 4.Bz-2-dihydroxybenzanthrone (melting point of the latter 250–252°).

The same result is obtained by melting the dibenzoic acid ester of 2.6-dihydroxynaphthalene directly with 10 times the quantity of sodium-aluminium chloride at 140–150° while introducing oxygen. The pure dihydroxydibenzpyrenequinone is obtained by an after-treatment of the crude melt with a solution of sodium hypochlorite at 60–70° C. The dyestuff forms a red powder which is soluble in concentrated sulfuric acid to a red solution with a violet hue. It gives with hydrosulfite a red vat dyeing a red tint which, on exposure to the air, changes to a violet tint which, owing to the presence of the free OH group, does not withstand the action of acid and chlorine.

3. By melting the benzoic acid ester of $\beta$-naphthol with ten times the quantity of sodium-aluminum chloride at a temperature of about 140–150° C., while introducing oxygen, there is obtained the known $\alpha$-hydroxybenzanthrone having most probably the formula:

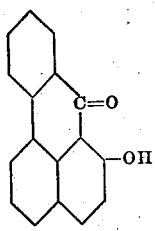

and melting at 176° C.

We claim:

1. As a new product 1.6-dihydroxy-3.4.8.9-dibenzpyrenequinone of the following constitution:

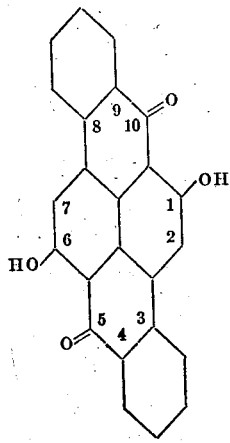

2. The process which comprises heating a compound of the general formula:

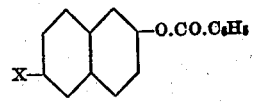

wherein X represents hydrogen or the group —O.CO.C$_6$H$_5$ in the presence of aluminum chloride to a temperature of from about 100° to about 200° C. while introducing oxygen.

3. The process which comprises heating a compound of the general formula:

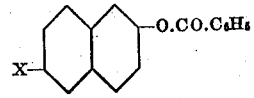

wherein X represents hydrogen or the group —O.CO.C$_6$H$_5$ in the presence of aluminum chloride to a temperature of from about 140° to about 150° C. while introducing oxygen.

4. The process which comprises heating the dibenzoic acid ester of 2.6-dihydroxy-naphthalene in the presence of aluminum chloride to a temperature of from about 100° to about 200° C. while introducing oxygen.

5. The process which comprises heating the dibenzoic acid ester of 2.6-dihydroxy-naphthalene in th presence of aluminum chloride to a temperature of from about 140° to about 150° C. while introducing oxygen.

In testimony whereof, we affix our signatures.

GEORG KRÄNZLEIN.
MARTIN CORELL.